United States Patent [19]

Gordon et al.

[11] B 4,001,380
[45] Jan. 4, 1977

[54] MANUFACTURE OF NITROGEN TRIFLUORIDE

[75] Inventors: Joseph Gordon, Morris Township, Morris County; Bernard Sukornick, Elizabeth, both of N.J.

[73] Assignee: Allied Chemical Corporation, Morris Township, N.J.

[22] Filed: May 16, 1961

[21] Appl. No.: 111,130

[44] Published under the second Trial Voluntary Protest Program on March 16, 1976 as document No. B 111,130.

[52] U.S. Cl. ............................. 423/406; 423/489
[51] Int. Cl.$^2$ ................. C01B 21/00; C01B 9/08
[58] Field of Search ............ 23/205; 423/406, 489

[56] References Cited
UNITED STATES PATENTS 3,055,817   9/1962   Gordon et al. ............... 423/489 X

FOREIGN PATENTS OR APPLICATIONS 625,055   8/1961   Canada ............................. 423/406

OTHER PUBLICATIONS

Gall, J., Fluorine–Derived Chemicals as Liquid Propellants, In Ind. and Eng. Chem. vol. 49, No. 9, 9/1957.

*Primary Examiner*—Benjamin R. Padgett
*Assistant Examiner*—R. E. Schafer
*Attorney, Agent, or Firm*—Ernest A. Polin; Jay P. Friedenson

[57]  ABSTRACT

A process for making nitrogen trifluoride by introducing gaseous fluorine azide into a reaction zone containing a fluorinating agent selected from nitrosyl fluoride and chlorine trifluoride.

10 Claims, No Drawings

MANUFACTURE OF NITROGEN TRIFLUORIDE

This invention relates to improved processes for making nitrogen trifluoride, $NF_3$, a material which is normally a colorless gas and which has a boiling point of about minus 129° C. and a melting point of about minus 208° C.

It has been proposed to make nitrogen trifluoride by electrolysis of molten ammonium acid fluoride, $NH_4HF_2$, using a graphite anode and temperature of about 125° C.; by reaction of fluorine azide with elemental fluorine; and by reaction of ammonia with elemental fluorine.

A major object of the present invention is to provide commercially feasible methods for making nitrogen trifluoride without recourse to electrochemical procedures; without the large loss of fluorine as $NH_4F$ necessarily involved in the reaction of ammonia and fluorine; and without the recognized disadvantages usually inherent in processes requiring use of elemental fluorine.

It has been found that certain relatively mild fluorinating agents, utilized under certain controlled reaction conditions, may be employed to convert fluorine azide to nitrogen trifluoride. We find that nitrosyl fluoride or chlorine trifluoride or mixtures of both, when reacted, under certain conditions, with fluorine azide bring about formation of nitrogen trifluoride. The invention comprises the discovery of the adaptability of fluorine azide as a starting material, the effectiveness of the fluorinating properties of nitrosyl fluoride and chlorine trifluoride with respect to conversion of fluorine azide to nitrogen trifluoride, and the reaction conditions, all of which factors interdependently cooperate to constitute practicable and easily controllable methods for making the sought-for nitrogen trifluoride without the use of elemental fluorine.

Flurine azide, $FN_3$, is a known greenish yellow normally gaseous material having a boiling point of about minus 78° to minus 82° C. and a melting point of about minus 154° C. As known, this azide may be prepared by reaction of gaseous fluorine and anhydrous gaseous hydrazoic acid, $HN_3$. The latter may be prepared by reaction of medium strength sulfuric acid and solid sodium azide, $NaN_3$. The hydrazoic acid thus formed may be swept out of the reaction vessel by a stream of inert gas such as helium. After drying to anhydrous condition, by means of any suitable desiccating agent, the hydrazoic acid, further diluted with helium or nitrogen, may be reacted with an equivalent amount of gaseous elemental fluorine at about room temperature, forming fluorine azide in substantially quantitative yield. Nitrosyl fluoride, NOF, is a known normally colorless gas material having a boiling point of about minus 56° C. Nitrosyl fluoride may be made, as known, by passing nitrosyl chloride over silver fluoride in a platinum tube at elevated temperatures, or by direct reaction of nitric oxide and elemental fluorine. Both the nitrosyl fluoride and chlorine trifluoride fluorinating agents of the invention process are available materials.

Although not fully understood, reactions involved in practice of the invention are thought to be along the lines of

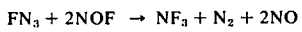

$FN_3 + 2NOF \rightarrow NF_3 + N_2 + 2NO$

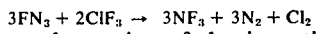

$3FN_3 + 2ClF_3 \rightarrow 3NF_3 + 3N_2 + Cl_2$

General practice of the invention comprises introducing gaseous fluorine azide into a reaction zone containing a fluorinating agent of the group consisting of nitrosyl fluoride and chlorine trifluoride, maintaining temperature in the reaction zone in the range of above the boiling point of fluorine azide and below about 100° C., and discharging the reaction zone gaseous reaction products containing nitrogen trifluoride.

Reactions may be carried out so that the fluorinating agent in the reaction zone is maintained in the liquid phase, or so that all materials in the reaction zone are in the gas phase. Apparatus employed is relatively simple. In the modification in which fluorinating agent is maintained in the liquid phase, the reactor may be a cylinder having a suitable valved inlet for controlled introduction of liquid fluorinating agent, and provided at the base with a gas inlet for introduction of metered quantities of incoming $FN_3$, and at the top with a gas outlet. The reactor may be associated with suitable refrigerating facilities for maintenance of reaction temperatures as stated herein. The gas outlet of the reactor communicates with the gas inlet of a cold trap equipped with refrigerating equipment to maintain the trap at the herein described low temperatures. The trap is usually provided with a gas vent to permit passage thru the trap of inert diluting gas, and may be equipped with other valved outlets thru which, during a reaction run, liquid condensate may be drawn off to a fractionator, or, following a reaction run, condensate may be fractionated off to recover nitrogen trifluoride to separate the same from other materials.

In the preferred procedural modification in which all materials in the reaction zone are maintained in the gas phase, the apparatus may comprise a tubular coil reactor of substantial length e.g. 10–12 feet long, and of relatively small inside diameter e.g. 0.25–1.0 inch, provided at one end with valved inlets for metered charging of incoming gaseous $FN_3$ and incoming gaseous NOF or $ClF_3$, and at the other end with a gas outlet connected to the inlet of a cold trap. A reactor of this type promotes intimate mixing of gases. Apparatus may be made of any suitable material, such as nickel and monel, which is corrosive-resistant to the reactants and products and by-products involved.

To avoid tendencies toward instability, the fluorine azide starting material employed in all modifications of the invention is preferably always maintained, handled and used in gas phase, i.e. the azide is held above a minimum temperature, conveniently say 10°–15° C. above the minus 78° - minus 82° C. boiling point, so that the material is always in gas phase. Operations are preferably caried out at substantially atmospheric pressure, although other pressures may be employed while having regard for maintenance of the azide in the gas phase. Further, to avoid possible explosion, a volume of $FN_3$ is preferably kept diluted with at least two volumes of an inert gas such as nitrogen or helium.

It has been found that in practice of all embodiments of the invention, reaction temperatures should be maintained in the reaction zone above the foregoing indicated boiling point of fluorine azide, about 10°–15° C. above the boiling point providing a feasible operating margin. Also, we find that stability of the fluorine azide in gas form is adequately maintained at temperature below about 100° C., but to enhance fluorine azide stability, in all modifications of the invention it is preferred to hold maximum temperature not substantially higher than 40° C. It has been found that in the stated temperature range, at substantially atmospheric pressure, the fluorine azide is maintained in the gas phase, and the unstable gas to liquid or liquid to gas transition stages are avoided.

In the preferred procedural embodiment of the invention, temperature conditions in the reaction zone are such as to maintain all materials therein in gas phase. When employing nitrosyl fluoride as the fluorinating agent, temperatures may be from anything feasibly above the minus 56° C. boiling point of NOF up to not more than about 100° C., a range, at substantially atmospheric pressure, of about minus 50°-plus 100° C. being practicable, and the range of about minus 50°-plus 40° C. being preferred. In the case of utilization of chlorine trifluoride as fluorinating agent, reaction zone temperatures may lie in the range of anything reasonably above the plus 11° C. boiling point of chlorine trifluoride up to about 100° C., for example a range of about plus 15° - plus 100° C. being satisfactory, and a range of about plus 15° - plus 40° C. being preferred. When because of particular operating exigencies, use of fluorinating agent in liquid phase in the reaction zone is desirable, where nitrosyl fluoride is employed as fluorinating agent, reaction zone temperatures may be held in the range above the boiling point of fluorine azide and below the boiling point of NOF, temperatures in the range of minus 70°-minus 60° C. being preferred. When chlorine trifluoride is the fluorinating agent, reaction zone temperatures may lie in the broader range of above the boiling point of fluorine azide to below the boiling point of chlorine trifluoride, preferably in the range of about minus 70° C.-zero °C.

With regard to molar proportions of fluorine azide starting material and fluorinating agent, while possible to operate using at least stoichiometrically equivalent molecular amounts of NOF or ClF$_3$, it has been found that in carrying out the reactions described it is highly desirable to employ a molecular excess of NOF or ClF$_3$ fluorinating agent, and we find that for preferred operation the fluorinating agent should be maintained present in the reaction zone in amount not substantially less than 100% of stoichiometric molecular requirements on the basis of the fluorine azide charged. The foregoing applies to all procedural modifications of the invention whether reactions are carried out in the liquid or gas phases. The indicated molecular excess of fluorinating agent provides for the better reaction results, for prevention of dimerization of FN$_3$ to F$_2$N$_2$, and more importantly prevents the presence of unreacted FN$_3$ in the reactor exit which FN$_3$, if present and entering the cold trap operating at temperature below the boiling point of FN$_3$, would pass thru the unstable gas to liquid stage.

When fluorinating with nitrosyl fluoride, whether reaction is gas or liquid phase, in addition to nitrogen trifluoride, materials exiting the reaction zone may include nitric oxide, NO, b.p. minus 153° C.; some difluorodiazine, N$_2$F$_2$, b.p. minus 111° C.; nitrogen, b.p. minus 196° C.; and nitrous oxide, N$_2$O, b.p. minus 90°C. In those instances in which chlorine trifluoride is employed as a fluorinating agent, the reaction zone exit in addition to nitrogen trifluoride may contain difluorodiazine, nitrogen, and chlorine, b.p. minus 34.5.

Recovery of nitrogen trifluoride and separation of the same from other materials contained in the gaseous exit of the reaction zone may be effected more or less conventionally as known in this art, i.e. by condensation followed by suitable fractionation. For example, all gaseous exit of the reactor, except nitrogen and any helium diluent, may be totally condensed in a cold trap externally refrigerated by means of liquid nitrogen. In subsequent fractionation of cold trap condensate, any nitric oxide, NO, (b.p. minus 153) distills off first, and thereafter nitrogen trifluoride may be recovered as fractionator overhead in relatively pure form in view of the substantial differences in boiling points between NO boiling well below the NF$_3$, and difluorodiazine, N$_2$F$_2$, which boils in the range of minus 106°-111°C., well above NF$_3$, and which may be present in relatively small amounts. Other materials such as nitrous oxide, N$_2$O, and nitrogen dioxide, N$_2$O$_4$, and any unreacted fluorinating agent are retained as fractionator bottoms. Alternatively, reactor exit may be refrigerated to any low temperature just suitably below the minus 129° C. boiling point of nitrogen trifluoride, e.g. to temperatures in the range of minus 140°-145° C. For this purpose the cold trap may be maintained in a slush bath of isopentane and liquid nitrogen. In this situation, at the end of a run the cold trap may be permitted to warm up and nitrogen trifluoride recovered as overhead, other materials such as N$_2$O, N$_2$O$_4$, N$_2$F$_2$, unreacted fluorinating agent, and possibly some tetrafluorohydrazine, N$_2$F$_4$ (b.p. minus 73° C.) being retained as bottoms in the cold trap. Further, in a continuous operation, condensate may be continuously withdrawn from the bottom of the cold trap and fractionated in separate equipment.

Nitrogen trifluoride is a material of known utility, for example as an intermediate for reaction with a metal to make tetrafluorohydrazine, N$_2$F$_4$, a commercially available material.

Fluorine azide may be made according to any suitable known method. The following, although utilizing elemental fluorine, affords a particularly advantageous technique because only a quantitative amount of fluorine is used, and the reaction is smooth and without explosive tendency. Apparatus employed included a three-necked flask fitted with a helium inlet tube, a burette, and an outlet tube leading to a Drierite scrubber. A sulfuric acid solution of about 76% H$_2$SO$_4$ strength was flowed from the burette drop-wise onto powdered sodium azide, NaN$_3$, in the flask at rate of about 0.05 cc/min. The NaN$_3$ material in the generator was held at temperature of about 48° C., by means of an electrically heated tape, to prevent liquefaction of the HN$_3$ formed. Hydrazoic acid gas, HN$_3$ was evolved at a rate of about 0.08 mol/hr. The HN$_3$ thus produced was diluted with helium and the gaseous mixture passed thru the Drierite to remove all traces of water and form an anhydrous mixture. Quantity of helium employed for dilution was such that the gas mixture container HN$_3$ and helium in volume ratio of about one to three. The anhydrous HN$_3$-helium gas mixture was run into the head end of a copper reactor coil, about 12 ft. long and about ¼ inch I.D., at rate to supply about 0.08 mol/hr of HN$_3$. At the same time, elemental fluorine diluted with nitrogen was introduced into the head end of the reactor coil. Nitrogen dilution was such as to form a mixture having a fluorine to nitrogen volume ratio of about one to 0.75. Rate of introduction of the fluorine-nitrogen mixture to the reactor was such as to charge elemental fluorine at a rate of about 0.045 mol/hr., i.e. slightly more than 0.5 mol of fluorine was fed per mol of HN$_3$. During the ensuing reaction, the reactor was maintained at temperature of about 25° C. The gaseous exit of the reactor contained fluorine azide, nitrogen and helium. Dilution of the fluorine azide gas with helium and nitrogen inerts, was such as to provide a fluorine azide-gaseous inerts volume ratio of about one to three. Infrared spectrum analysis of the gaseous exit of the reactor showed a complete absence of nitrogen trifluoride, thus showing no detectable conversion of $FN_3$ to $NF_3$ by the slight excess of fluorine present.

The following illustrate practice of the invention.

EXAMPLE 1

Apparatus employed comprised principally a nickel tubular reactor, about 6 inches long, and about 1 inch I.D., provided at the base with a gas inlet for incoming $FN_3$, and at the top with a gas outlet. About 5 gms. (0.1 mol) of nitrosyl fluoride were condensed and introduced into the reactor. Over a period of about 20 minutes, fluorine azide gas, made as described above and having the indicated inert dilution, was fed into the reactor, and bubbled thru the liquid NOF. Throughout the run, temperature in the reactor was maintained substantially in the range of minus 70° to minus 60° C. by means of an acetone-dry ice mixture. Rate of feed of fluorine azide into the liquid NOF was about 0.08 mol/hr. The overall quantity of fluorine azide charged was such that throughout the run there was maintained in the reactor a substantial molecular excess of NOF, and in this particular instance the molecular excess of NOF was always over about 100% of stoichiometric requirements. Infrared spectrum analysis of the gas exiting the reactor showed that the gaseous reaction products discharged from the reactor contained, for an average throughout the run, a dominant volume portion of nitrogen trifluoride; plus smaller amounts of difluorodiazine, $N_2F_2$; nitrous oxide, $N_2O$, nitrogen dioxide, $N_2O$; and some unreacted NOF. Unreacted $FN_3$ was not discernible.

EXAMPLE 2

Apparatus employed comprised principally a nickel tubular coil reactor, about 4 feet long, about 0.25 inches I.D., and provided at one end with an inlet for incoming gaseous $FN_3$ and an inlet for gaseous NOF, and at the other end with a gas outlet. Liquid nitrosyl fluoride was vaporized and introduced into the reactor at a rate such that, all during the run, there was maintained in the reactor at least a 100% molecular excess of NOF over stoichiometric requirements. Over a period of about 20 minutes, fluorine azide gas, made as described above and having the indicated inert dilution was fed into the reactor. Throughout the run, temperature in the reactor was maintained substantially at room temperature, i.e. all materials in the reactor were in gas phase. Infrared spectrum analysis of the gas exiting the reactor showed that the gaseous reaction products discharged from the reactor contained, for an average throughout the run, a dominant volume portion of nitrogen trifluoride plus smaller amounts of nitrous oxide, $N_2O$, nitric oxide, NO; nitrogen dioxide, $N_2O_4$ and some unreacted NOF. No unreacted $FN_3$ was detected.

EXAMPLE 3

Apparatus employed was substantially the same as in Example 1. Liquid chlorine trifluoride was condensed and introduced into the nickel reactor. Over a period of about 20 minutes, fluorine azide gas, made as described above and having the indicated inert gas dilution, was fed into the reactor and bubbled thru the liquid $ClF_3$. Throughout the run, by means of an acetone-dry ice-$CCl_2F_2$ mixture, temperature in the reactor was maintained at about minus 40° C., i.e. the $ClF_3$ in the reactor was held in the liquid phase. Rate of feed of fluorine azide was about 0.08 mol/hr. The overall quantity of fluorine azide charged was such that there was maintained in the reactor, all during the run, at least 100% molecular excess of $ClF_3$ over stoichiometric requirements. Infrared spectrum analysis of the gas exiting the reactor showed that the gaseous products discharged from the reactor contained, for an average throughout the run, a dominant volume portion of nitrogen trifluoride; plus smaller amounts of difluorodiazine, $N_2F_2$; and some unreacted $ClF_3$. No unreacted $FN_3$ was found.

We claim

1. The process for making nitrogen trifluoride which comprises introducing gaseous fluorine azide into a reaction zone containing fluorinating agent of the group consisting of nitrosyl fluoride and chlorine trifluoride, maintaining temperature in the reaction zone in the range of above the boiling point of fluorine azide and below about 100° C., and discharging from the reaction zone gaseous reaction products containing nitrogen trifluoride.

2. The process of claim 1 in which temperature is not substantially higher than 40° C.

3. The process of claim 1 in which the volume of gaseous fluorine azide charged is diluted with at least two volumes of an inert gas.

4. The process of claim 1 in which the fluorinating agent is maintained present in amount not substantially less than 100% mol excess of stoichiometric requirements on the basis of the fluorine azide charged.

5. The process for making nitrogen trifluoride which comprises introducing into a reaction zone gaseous fluorine azide and fluorinating agent of the group consisting of gaseous nitrosyl fluoride and gaseous chlorine trifluoride, regulating temperature in the reaction zone to maintain all reactants and reaction products in the gas phase but below about 100° C., and discharging from the reaction zone gaseous reaction products containing nitrogen trifluoride.

6. The process of claim 5 in which temperature is not substantially higher than 40° C.

7. The process of claim 5 in which the volume of gaseous fluorine azide charged is diluted with at least two volumes of an inert gas, and the fluorinating agent is maintained present in amount not substantially less than 100% mol excess of stoichiometric requirements on the basis of the fluorine azide charged.

8. The process for making nitrogen trifluoride which comprises introducing gaseous fluorine azide into a reaction zone containing fluorinating agent of the group consisting of liquid nitrosyl fluoride and liquid chlorine trifluoride, maintaining temperature in the reaction zone in the range of above the boiling point of fluorine azide and below the boiling point of the fluorinating agent, and discharging from the reaction zone gaseous reaction products containing nitrogen trifluoride.

9. The process for making nitrogen trifluoride which comprises introducing into a reaction zone gaseous fluorine azide and gaseous nitrosyl fluoride, regulating temperature in the reaction zone to maintain all reactants and reaction products in the gas phase but below about 40° C., and discharging from the reaction zone gaseous reaction products containing nitrogen trifluoride.

10. The process of claim 9 in which the volume of gaseous fluorine azide charged is diluted with at least two volumes of an inert gas, and the nitrosyl fluoride is maintained present in amount not substantially less than 100% mol excess of stoichimetric requirements on the basis of the fluorine azide charged.

* * * * *